Patented May 6, 1941

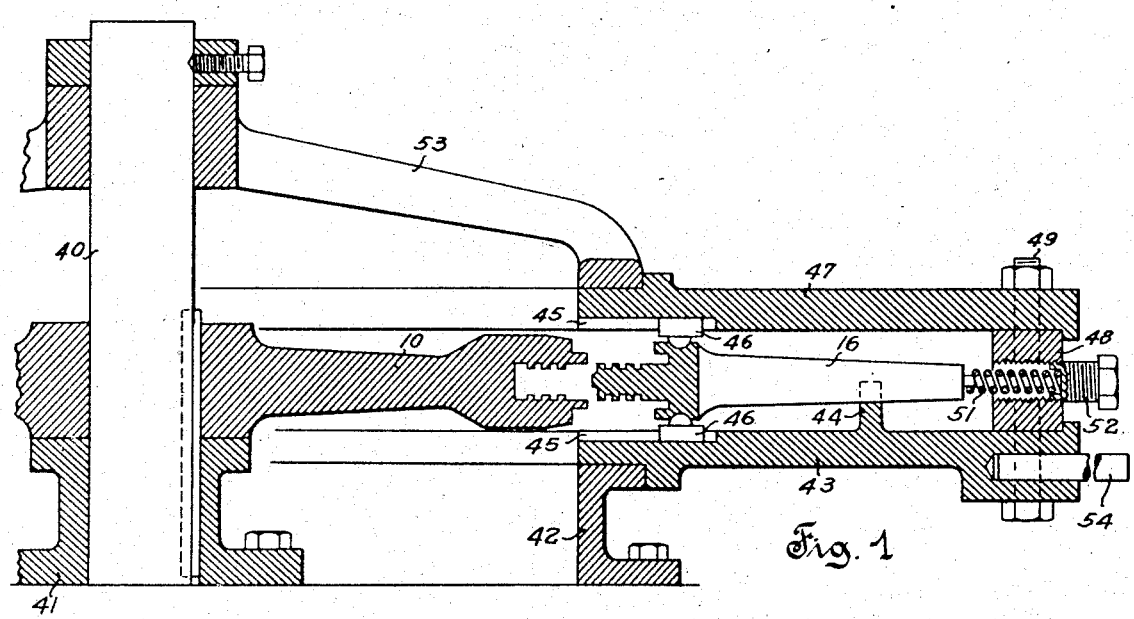
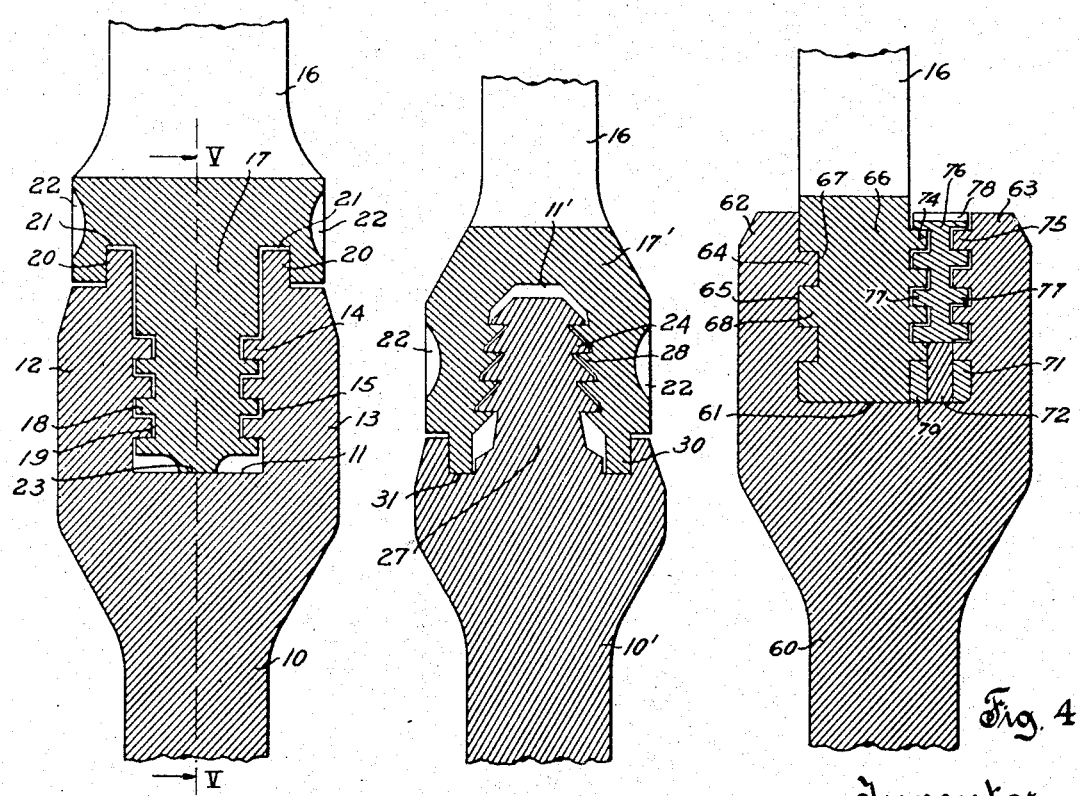

2,240,743

UNITED STATES PATENT OFFICE 2,240,743

APPARATUS FOR ATTACHING TURBINE BLADES

Robert C. Allen, Wauwatosa, Wis., assignor to Allis-Chalmers Manufacturing Company, Milwaukee, Wis., a corporation of Delaware Original application November 26, 1937, Serial No. 176,515. Divided and this application July 15, 1940, Serial No. 345,509

3 Claims. (Cl. 29—23.5)

This invention relates to a novel means, apparatus for and method of attaching peripheral members on a central support.

More specifically, the invention relates to a novel attachment of steam or gas turbine blades on a spindle, and is particularly adapted to high temperature turbines and constructions in which turbine blades are subjected to stresses approaching the elastic limit of the material thereof.

This application is a division of applicant's parent application Serial No. 176,515, filed November 26, 1937. The turbine blade of this invention and means and method of attaching the blade to the spindle are claimed in the parent application.

It has long been known to attach turbine blades by inserting the roots of each blade in grooves provided in the turbine spindle or disk. One great objection to this type of attachment is the fact that it was necessary to provide a slot or recess in one side wall of the spindle or disk groove in order to make it possible to insert the last blade of any given row. This slot or recess was later filled in by welding or calking, but resulted in a weakened and unbalanced construction.

It is an object of this invention to provide a sturdy and simple attachment of peripheral members on a central support; and especially for turbine blades on a central spindle or disk.

It is a primary object of this invention to provide a construction characterized by uniformity of attachment throughout the row of peripheral members.

It is a further object of this invention to provide an apparatus for fastening peripheral members to a rotatable support, said apparatus comprising a holder for the support, a holder for a plurality of peripheral members, and means for rotating said holders with respect to each other. Means may be provided on such apparatus for yieldingly urging said peripheral members toward said rotatable support.

Further objects and advantages of this invention will appear from the following description and drawings relating to specific embodiments of this invention.

In the accompanying drawings,

Fig. 1 is a cross-sectional elevation view of an apparatus used in attaching a turbine blade in accordance with this invention.

Figs. 2, 3 and 4 are cross-sectional views of various modifications of blade attachment in accordance with this invention, showing parts of disks and blades attached thereto.

Figure 5:
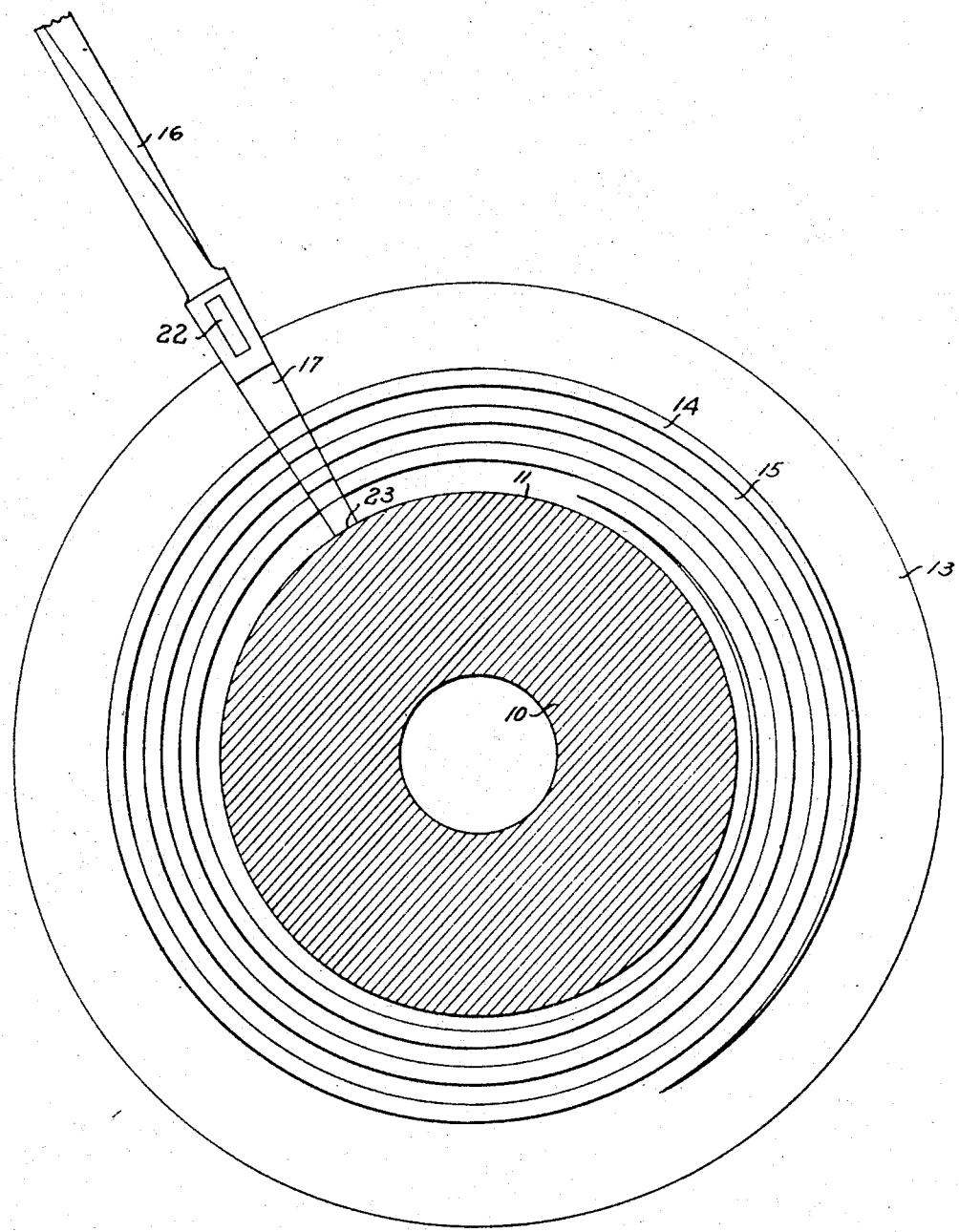
Fig. 5 is a sectional elevation view of a turbine disk with one blade in place in the annular groove thereof, the section being taken on line V—V of Fig. 2.

In the embodiment of the invention illustrated in Fig. 2, the turbine spindle or disk is provided with a groove 11 having side walls 12, 13. Each of the walls 12, 13 is, on its inner surface, spirally threaded as shown in Fig. 5, one or more threads 14 and intervening grooves 15 being provided.

The peripheral members or blades 16 are provided with root portions 17 which fit into groove 11. The sides of the root portions are provided with projections 18 and grooves 19, which are constructed to mate with spiral thread and groove 14, 15 of walls 12, 13. These projections and grooves 18, 19 may be formed on the blades by arranging the blades in a circular row, such as they are to occupy on the spindle or disk, and cutting a spiral thread in the roots of the assembled blades corresponding to spiral thread 14, 15 on the turbine disk. To keep groove walls 12, 13 from spreading apart when the blade roots are threaded in place, annular projections 20 are formed on these walls which are engaged in grooves 21 at the base of each blade root. Recesses 22 are provided at each side of the blade, for inserting a tool therein while assembling or disassembling the blades with respect to their disk support. A bearing surface 23 is provided in the end of the blade root, to bear against the bottom of groove 11 when the blade is in place on its support.

The construction illustrated in Fig. 3 is similar to the embodiment shown in Fig. 2, except that in Fig. 3 the groove 11' is formed in the blade root 17', and an annular tongue 27 is provided on the periphery of disk 10'. Tongue and groove are both spirally threaded as shown at 24, 28, similarly to the construction shown in Fig. 2. In this case a modified V thread is shown, but a rectangular thread such as is shown in Fig. 2 may be used. At each side of tongue 27, an annular groove 31 is provided, which coacts with projections 30 at the end of root portion 17', to keep the two sides of the root portion from spreading.

As shown in Fig. 3, tongue 27 is tapered, being narrower in cross-section at the tip than near the base. When blades 16 are threaded on this tapered tongue 27, the narrow tip of the tongue makes entry of the tongue within groove 11' easy. As the blades are further threaded on the tongue, tongue 27 advances within groove 11' and the wider portion of the tongue causes the walls of groove 11' to tend to spread apart. Grooves 31 prevent this spreading of the walls of groove 11' beyond a desired point. It will be seen that the wedging effect produced by tapered tongue 27 and grooves 31 results in intimate contact between the tongue 27 and the walls of groove 11'.

The method of and apparatus for assembling blades on a supporting disk are illustrated in Fig. 1. The disk 10 is fixedly mounted on shaft 40 which is mounted in bearing 41. Stationary frame 42 rotatably supports a blade-holding jig, of which lower plate 43 carries blade supporting fingers 44. A plurality of radial slots 45 carry slidable Woodruff keys 46. Radially supported by plate 43 is a plurality of turbine blades 16 supported intermediate their ends by fingers 44 and adjacent their roots by keys 46 which fit into appropriate recesses 22. The blade-holding jig is completed by an upper plate 47, also provided with slots 45 and slidable Woodruff keys 46, said plate being spaced from lower plate 43 by spacing ring 48. The plates are clamped together by suitable bolts 49. Each blade 16 is urged inward by a spring 51 mounted between the outer tip of the blade and an adjustable screw 52.

To mount the blades on a turbine disk 10, the disk is placed on shaft 40 in the position shown. A number of blades 16 sufficient for a complete row are placed on lower disk 43 in radial positions, spacing ring 48 is mounted in place, and upper disk 47 is placed thereon and clamped to the spacing ring and lower disk 43. Spider 53 is then mounted on shaft 40 and retained thereon by any suitable means. Springs 51 are then inserted through appropriate apertures in ring 48 and backed up by screws 52 to obtain any desired compression on the springs. This urges the blades inward until the roots of the blades contact the threads of groove 11. The jig is now rotated, as by means of handle 54, thereby rotating the blades with respect to the stationary disk, thereby threading the blade roots along the spiral threads 14 of groove 11. This rotation is continued until bearing surface 23 bears against the bottom of groove 11, when the operation is complete.

It will be noted that when the blades are in position, as shown in Fig. 2, the blade roots are wedged in place between the bottom of groove 11 and the inner surfaces of threads 14, resulting in a permanently tight connection. As shown, the threads 18 may be somewhat narrower than grooves 15, preventing any possible binding during the mounting of the blades on the disk.

It will be obvious that instead of turning jig 43, 47, the jig may be held stationary and disk 10 may be rotated with respect thereto, to thread the blades in place. It is also clear that, instead of threading the blades on the disk individually, blade segments comprising two or more blades may be threaded thereon in similar manner.

Fig. 4 illustrates a further embodiment of the invention. In this modification, the disk 60 is provided with a wide groove 61 having walls 62, 63. Wall 62 has one or more ridges and grooves 64, 65 concentric with disk 60. The root portion 66 of blade 16 is provided on one side with grooves and ridges 67, 68 mating with ridges and grooves 64, 65 respectively. Groove 61 is of such width that the root 66 may be inserted freely in the groove and then moved axially of the disk to engage grooves and ridges 64, 65 and 67, 68. Then segmental calking pieces 70, 71 and 72 are arranged in the position shown.

The other side of root 66 and the inner surface of wall 63 are provided with a spiral thread or threads 74, 75. A plurality of segmental fastening members 76 are provided with corresponding threads 77 which engage threads 74, 75 and are mounted on the disk in the same way as are blades 16 in the construction of Fig. 2. Slots 78 are provided at the surface of segmental fastening members 76 for engagement by suitable tools for threading the fastening members into position.

While the construction of Fig. 4 is somewhat more complicated than that of Figs. 2 and 3, it may be preferable because it avoids any possibility of excessive strain on the blades themselves in mounting them on the disk, since in this case the force is applied to fastening members 76 instead of the blades themselves.

It will be understood that the invention makes possible a rugged construction in which the blades are safely retained in place despite the great centrifugal forces, axial thrusts, high temperatures and pressures and vibratory forces to which they are subjected in use.

While this invention has been illustrated as being applied to turbine blades, it is clear that the apparatus for attaching the blades may be utilized to mount any peripheral members on a central support in the manner herein disclosed. While the invention has been illustrated by specific applications, it will be understood that the scope of the invention is limited only by the claims appended hereto.

The term "disk" as used in the claims is intended to include a turbine spindle or a part thereof, such as a ring or disk.

It is claimed and desired to secure by Letters Patent:

1. A blade-mounting apparatus comprising a support for a turbine disk, means independent of said disk for supporting a plurality of turbine blades in radial positions around a substantial portion of the periphery of said disk and in the plane thereof, and means for rotating said blade support relatively to said disk support.

2. A blade-mounting apparatus comprising a support for a turbine disk, means independent of said disk for supporting a plurality of turbine blades in radial positions substantially surrounding said disk and in the plane thereof, resilient means for urging said blades radially inward, and means for rotating said blade support relatively to said disk support.

3. Apparatus for attaching peripheral members to a central support comprising means for supporting said central support, means independent of said central support for supporting a plurality of peripheral members in radial positions substantially surrounding said central support and in the plane thereof, and means for rotating said peripheral member supporting means relatively to said central supporting means.

ROBERT C. ALLEN.